US011716938B2

(12) United States Patent
Song (10) Patent No.: US 11,716,938 B2
(45) Date of Patent: Aug. 8, 2023

(54) PLANT CULTIVATION LIGHT SOURCE AND PLANT CULTIVATION DEVICE

(71) Applicant: SEOUL VIOSYS CO., LTD., Gyeonggi-do (KR)

(72) Inventor: Hyun Su Song, Gyeonggi-do (KR)

(73) Assignee: SEOUL VIOSYS CO., LTD., Ansan-si (KR)

( * ) Notice: Subject to any disclaimer, the term of this patent is extended or adjusted under 35 U.S.C. 154(b) by 273 days.

(21) Appl. No.: 16/827,084

(22) Filed: Mar. 23, 2020

(65) Prior Publication Data

US 2020/0305353 A1 Oct. 1, 2020

Related U.S. Application Data

(60) Provisional application No. 62/894,266, filed on Aug. 30, 2019, provisional application No. 62/823,962, filed on Mar. 26, 2019.

(51) Int. Cl.
*A01G 7/04* (2006.01)
*A01G 31/00* (2018.01)
*H05B 47/16* (2020.01)
*A01G 22/25* (2018.01)

(52) U.S. Cl.
CPC .......... *A01G 7/045* (2013.01); *A01G 22/25* (2018.02); *A01G 31/00* (2013.01); *H05B 47/16* (2020.01); *A01G 2031/006* (2013.01)

(58) Field of Classification Search
CPC ........ A01G 7/045; A01G 22/25; A01G 31/00; A01G 2031/006
See application file for complete search history.

(56) References Cited

U.S. PATENT DOCUMENTS

| 2009/0288340 | A1* | 11/2009 | Hess | A01G 7/045 47/58.1 LS |
| 2014/0170733 | A1* | 6/2014 | Shigyo | C12N 13/00 435/257.1 |
| 2021/0351328 | A1* | 11/2021 | Goto | H01L 33/486 |
| 2021/0391498 | A1* | 12/2021 | Tångring | H01L 33/502 |

FOREIGN PATENT DOCUMENTS

| EP | 2989887 A1 | 3/2016 |
| GB | 2402037 A | 12/2004 |
| JP | 2016052264 A | 4/2016 |
| KR | 1020170009012 | 1/2017 |
| KR | 1020170020881 | 2/2017 |
| KR | 1020170136097 | 12/2017 |
| KR | 1020170139731 | 12/2017 |

(Continued)

OTHER PUBLICATIONS

Office Action from corresponding Chinese Patent Application No. 202080004395.6 dated Aug. 5, 2022 (8 pages).

(Continued)

*Primary Examiner* — Kristen C Hayes
(74) *Attorney, Agent, or Firm* — Perkins Coie LLP (57) ABSTRACT

Disclosed herein are a plant cultivation light source and a plant cultivation apparatus. The plant cultivation light source includes a main light source and an auxiliary light source. The main light source emits light having at least two peak wavelengths. The at least two peak wavelengths fall within a wavelength region absorbed by chlorophyll.

20 Claims, 9 Drawing Sheets

(56) References Cited

FOREIGN PATENT DOCUMENTS

| KR | 101904676 B1 | 10/2018 | |
|----|----|----|----|
| WO | 2012060627 | 5/2012 | |
| WO | 15190405 A1 | 12/2015 | |
| WO | WO-2016194312 A1 * | 12/2016 | ............. A01G 31/02 |
| WO | WO-2018020935 A1 * | 2/2018 | ............. A01G 31/00 |
| WO | 18084275 A1 | 5/2018 | |

OTHER PUBLICATIONS

International Search Report for International Application PCT/KR2020/004122, dated Jul. 13, 2020.
European Search report from corresponding EP Application No. 20779767.1, dated Nov. 21, 2022 (9 pages).

* cited by examiner

PLANT CULTIVATION LIGHT SOURCE AND PLANT CULTIVATION DEVICE

CROSS-REFERENCE OF RELATED APPLICATIONS

The present application is a nonprovisional application which claims priorities and the benefits of Provisional Application Nos. 62/823,962 filed Mar. 26, 2019 and 62/894,266 filed Aug. 30, 2019. The contents of each application noted above are incorporated by reference in their entirety.

TECHNICAL FIELD

The present disclosure relates to a plant cultivation light source and a plant cultivation apparatus.

BACKGROUND

Plants produce organic matter from carbon dioxide and water using light energy through photosynthesis. Plants use chemical energy of organic matter obtained through photosynthesis as nutrients for growth.

Plants contain phytochemicals that have beneficial effects on a subject in need thereof. Phytochemical levels of plants vary depending on growth environments. For example, plants produce antioxidants to protect themselves against damage from oxidative stress. When a human eats a plant that contains a large amount of phytochemicals, such phytochemicals bring in similar beneficial effects on a human body. Therefore, in order to obtain phytochemicals efficiently, it is desirable to harvest a plant when the content of phytochemicals in the plant reaches a maximum value thereof.

One way to increase the phytochemical content of plants is to subject plants to illumination in order to apply stress to plants. Most experiments related to this subject have been conducted on full sun plants. Therefore, light stress conditions known in the art are not suitable for shade plants. Shade plants are plants that can live in the shade due to low light saturation and light compensation points thereof. Examples of shade plants may include ginseng, deodeok, leek, ginger, lemon balm, mint, and the like. Such known light stress conditions can cause photodamage to shade plants, which have low light saturation points.

In addition, since shade plants have low saturation points, sunlight alone can cause the shade plants to be exposed to light intensity higher than necessary to perform photosynthesis. As a result, photosynthetic efficiency of shade plants is reduced due to photoinhibition, resulting in poor growth.

SUMMARY OF THE INVENTION

Embodiments of the present disclosure provide a plant cultivation light source and a plant cultivation apparatus, which can increase the yield rate of a plant while increasing the phytochemical content of the plant.

In accordance with one embodiment of the present disclosure, a plant cultivation apparatus includes: a housing; a cultivation member; and a light source member. The housing has a nutrient medium space for supplying a nutrient medium to an emerged seedling of a plant. The cultivation member is disposed above the nutrient medium space and includes a cultivation plate on which the seedling is cultivated. The light source member is disposed above the cultivation plate to illuminate the seedling.

In accordance with another embodiment of the present disclosure, a plant cultivation light source includes: a main light source; and an auxiliary light source. Here, the main light source emits light having at least two peak wavelengths. The at least two peak wavelengths fall within a wavelength region absorbed by chlorophyll.

According to the embodiments of the present disclosure, the plant cultivation light source and the plant cultivation apparatus can increase the content of a phytochemical in a plant without deterioration in quality.

In addition, according to the embodiments of the present disclosure, the plant cultivation light source and the plant cultivation apparatus can prevent the roots of the plant from rotting through control over the level of the nutrient medium.

Further, according to the embodiments of the present disclosure, the plant cultivation light source and the plant cultivation apparatus can increase the yield rate of the plant by minimizing loss due to quality degradation.

BRIEF DESCRIPTION OF THE DRAWINGS

FIG. 3 to FIG. 12 show results of an experiment to determine change in phytochemical content of sprout ginseng depending on light intensity, where:

FIG. 16 to FIG. 18 show results of an experiment to determine the survival rate of sprout ginseng depending on the level of a nutrient medium, where:

DETAILED DESCRIPTION OF EMBODIMENTS

Hereinafter, embodiments of the present disclosure will be described with reference to the accompanying drawings. It should be understood that the embodiments are provided for complete disclosure and thorough understanding of the present disclosure by those skilled in the art. Therefore, the present disclosure is not limited to the following embodiments and may be embodied in different ways. In addition, the drawings may be exaggerated in width, length, and thickness of components for descriptive convenience and clarity only. Like components will be denoted by like reference numerals throughout the specification.

In accordance with one embodiment of the present disclosure, a plant cultivation apparatus includes: a housing, a cultivation member, and a light source member. The housing has a nutrient medium space provided to supply a nutrient medium to an emerged seedling of a plant. The cultivation member is disposed above the nutrient medium space and includes a cultivation plate on which the seedling is cultivated. In addition, the light source member is disposed above the cultivation plate to illuminate the seedling.

Here, the light source member includes a main light source and an auxiliary light source. The main light source may emit light having at least two peak wavelengths absorbed by chlorophyll.

In addition, the level of the nutrient medium in the nutrient medium space is set to allow roots of the seedling to be partially immersed in the nutrient medium.

In some embodiments, the main light source may emit light having a first peak wavelength and a second peak wavelength. Here, the intensity of the first peak wavelength may be the same as the intensity of the second peak wavelength.

In addition, the main light source may emit red light and blue light.

In some embodiments, the intensity of the red light emitted from the main light source may be same as the intensity of the blue light emitted from the main light source.

In other embodiments, the auxiliary light source may emit white light.

In some embodiments, the light source member emits light during a light period and does not emit light during a dark period. Here, the light period may be set to 16 hours per day and the dark period may be set to 8 hours per day.

The light emitted from the light source member may increase the content of a phytochemical in the plant.

Further, the light emitted from the light source member may increase the content of the phytochemical in the plant without causing photodamage to the plant.

The phytochemical may be ginsenoside.

In some embodiments, the light source member may emit light having a wavelength of 400 nm to 700 nm.

Additionally, or alternatively, the light emitted from the light source member may have a light intensity of greater than 27 PPFD ($\mu mol/m^2/s$) and less than 268 PPFD.

In accordance with another embodiment of the present invention, a plant cultivation light source includes a main light source and an auxiliary light source. Here, the main light source emits light having at least two peak wavelengths. Here, the at least two peak wavelengths fall within a wavelength region absorbed by chlorophyll.

In some embodiments, the main light source may emit light having a first peak wavelength and a second peak wavelength. The intensity of the first peak wavelength may be the same as the intensity of the second peak wavelength.

In addition, the main light source may emit red light and blue light. The intensity of the red light emitted from the main light source may be the same as the intensity of the blue light emitted from the main light source.

In other embodiments, the auxiliary light source may emit white light.

In another embodiment, the main light source and the auxiliary light source emit light during a light period and do not emit light during a dark period. Here, the light period may be set to 16 hours per day, and the dark period may be set to 8 hours per day.

The light emitted from the main light source and the auxiliary light source may increase the content of a phytochemical in a plant.

Further, the light emitted from the main light source and the auxiliary light source may increase the content of the phytochemical in the plant without causing photodamage to the plant.

In some embodiments, the phytochemical may be ginsenoside.

The plant cultivation light source may emit light having a wavelength of 400 nm to 700 nm.

Additionally, or alternatively, the light emitted from the plant cultivation light source may have a light intensity of greater than 27 PPFD ($\mu mol/m^2/s$) and less than 268 PPFD.

Now, the plant cultivation light source and the plant cultivation apparatus according to the present disclosure will be described with reference to the accompanying drawings. Here, the present disclosure will be described using sprout ginseng as an example.

In some embodiments, ginseng is a representative herbal plant in Korea and is known to have efficacies such as anti-fatigue, anti-aging, immune enhancement, hyperglycemia suppression, protein synthesis promotion, anti-cancer, and detoxification.

In other embodiments, ginseng contains about 5.22% of ginsenoside, which is a mixture of 13 or more saponins, as a main component. The content of a medicinal ingredient in the ginseng, such as ginsenoside, varies in different parts, such as leaves, stems, and roots.

In yet another embodiment, recently, sprout ginseng, which is produced by cultivating a ginseng seedling aged 2 years or less about 1 month until the seedling grows leaves, is drawing attention. Leaves, stems, and roots of the sprout ginseng are all edible. Particularly, the leaves and stems of the sprout ginseng contain eight to nine times as many saponins as those of general ginseng aged 4 to 6 years.

In yet another embodiment, first, a ginseng seedling that has a weight of 0.8 g or more, has no wounds and lesions on the roots thereof, and can emerge under low-temperature stimulation is prepared. Here, the ginseng seedling is prepared by germinating a ginseng seed, followed by cultivation for about 12 to 18 months.

In yet another embodiment, the ginseng seedling is left under high humidity (80% to 100% RH) and dark conditions for 3 to 4 days to emerge. If the emergence period is further prolonged, the ginseng seedling is likely to become moldy due to high humidity. Plural ginseng seedlings grown under these conditions can exhibit a constant emergence rate.

In yet another embodiment, the emerged ginseng seedling is grown into sprout ginseng using the plant cultivation light source and the plant cultivation apparatus according to embodiments of the present disclosure.

Specifically, the emerged ginseng seedling is replanted in a space for cultivation of sprout ginseng. The space for cultivation of sprout ginseng provides an environment with a temperature of 20° C. to 25° C. and a relative humidity of 60% to 80%.

In addition, the sprout ginseng is supplied with light by the plant cultivation light source according to the embodiment.

In yet another embodiment, sprout ginseng is a semi-negative plant and is thus vulnerable to high temperatures and direct light. Therefore, if the ginseng seedling grows into sprout ginseng under exposure to strong light, the sprout ginseng can suffer photodamage in leaves thereof, such as, leaf chlorosis or leaf burn. Further, due to photodamage in the leaves, the roots of the ginseng seedling can rot. However, sprout ginseng grown from a ginseng seedling under exposure to moderate light can produce a larger amount of a phytochemical to have higher resistance to light stress. Here, the phytochemical may be, for example, ginsenoside.

Figure 1:
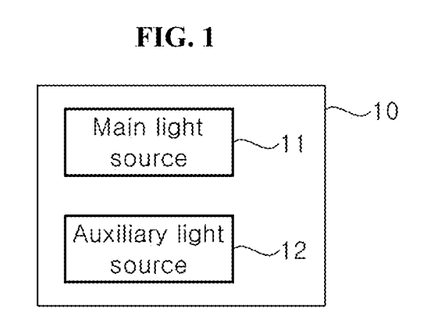
FIG. 1 is a block diagram of a plant cultivation light source according to one embodiment of the present disclosure.

The plant cultivation light source 10 according to this embodiment includes a main light source 11 and an auxiliary light source 12. Each of the main light source 11 and the auxiliary light source 12 of the plant cultivation light source 10 may include a light emitting diode (LED).

FIG. 1 is a block diagram of the plant cultivation light source according to some embodiments of the present disclosure.

Figure 2:
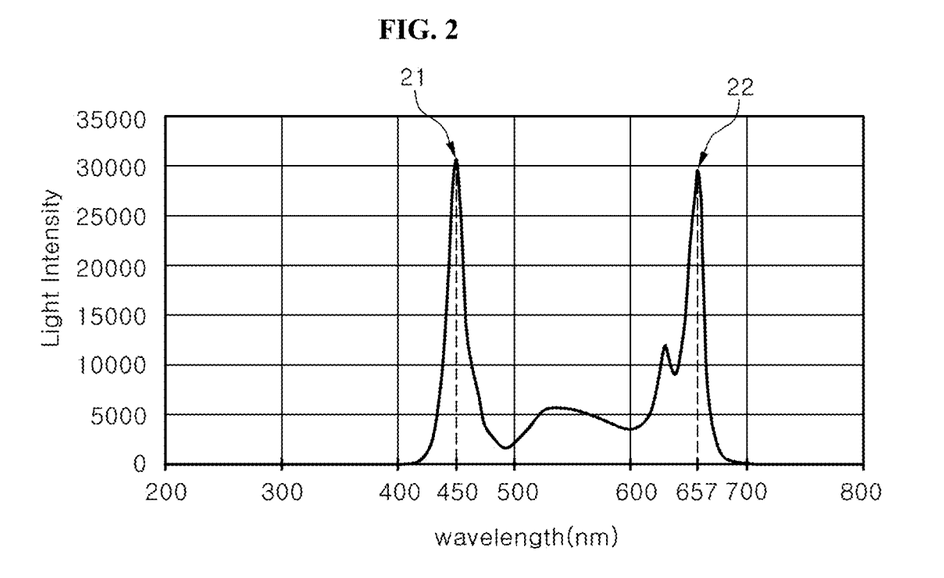
FIG. 2 is a graph showing the spectrum of light emitted from the plant cultivation light source according to the embodiment.

FIG. 2 is a graph showing the spectrum of light emitted from the plant cultivation light source.

Referring to FIG. 2, the main light source 11 emits light having at least two peak wavelengths absorbed by chlorophyll of a plant. In addition, the auxiliary light source 12 may emit white light.

For example, the main light source 11 emits light in a wavelength region including a first peak wavelength 21 and a second peak wavelength 22 of FIG. 2. The first peak wavelength 21 falls within the wavelength region of blue light and corresponds to a wavelength of about 450 nm. In addition, the second peak wavelength 22 falls within the wavelength region of red light and corresponds to a wavelength of 657 nm. Further, the intensity of the first peak wavelength 21 is substantially the same as the intensity of the second peak wavelength 22. Accordingly, the blue light and the red light may be emitted from the main light source 11 in an irradiance ratio of 1:1.

The plant cultivation light source 10 according to this embodiment emits light having a light intensity of greater than 27 PPFD ($\mu mol/m^2/s$) and less than 268 PPFD.

FIG. 3 to FIG. 12 and Table 1 show results of an experiment to determine change in phytochemical content of sprout ginseng depending on light intensity.

Plural groups of ginseng seedlings were grown into sprout ginseng samples under illumination with different intensity levels for a certain period of time, followed by measurement of the content of ginsenoside in an aboveground part of each of the sprout ginseng samples. Here, each ginseng seedling group included plural ginseng seedlings, and measured values of the ginsenoside content of the plural ginseng seedlings were averaged. In addition, measured ginsenoside components were Rg1, Re, Rf, Rg2, Rb1, Rc, Rb2, Rb3 and Rd.

This experiment was conducted at light intensities of 12 PPFD, 27 PPFD, 70 PPFD, 153 PPFD, and 268 PPFD. Herein, the light intensity refers to photosynthetic photon flux density (PPFD) (unit: $\mu mol/m^2/s$).

Figure 3:
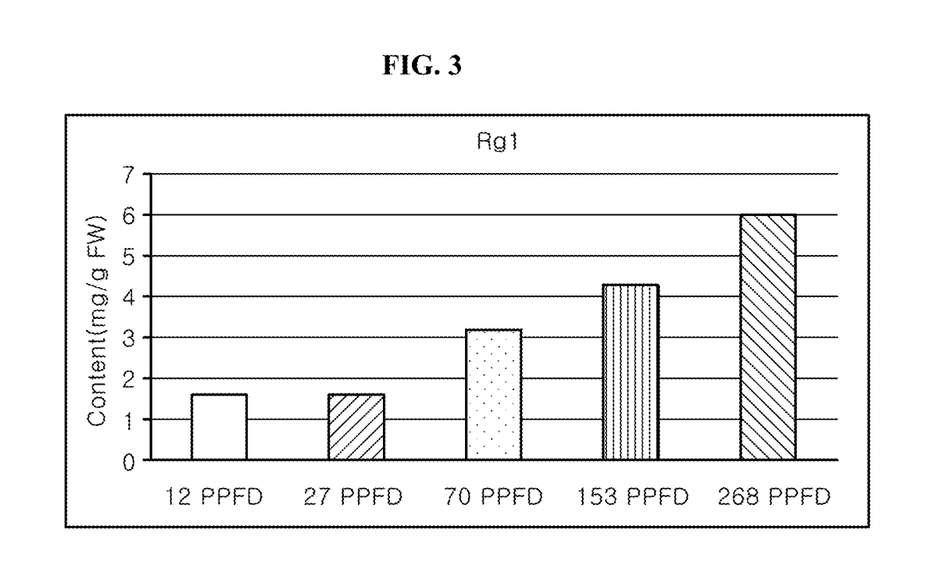
FIG. 3 is a graph illustrating the content of Rg1 with respect to the light intensity.
Figure 4:
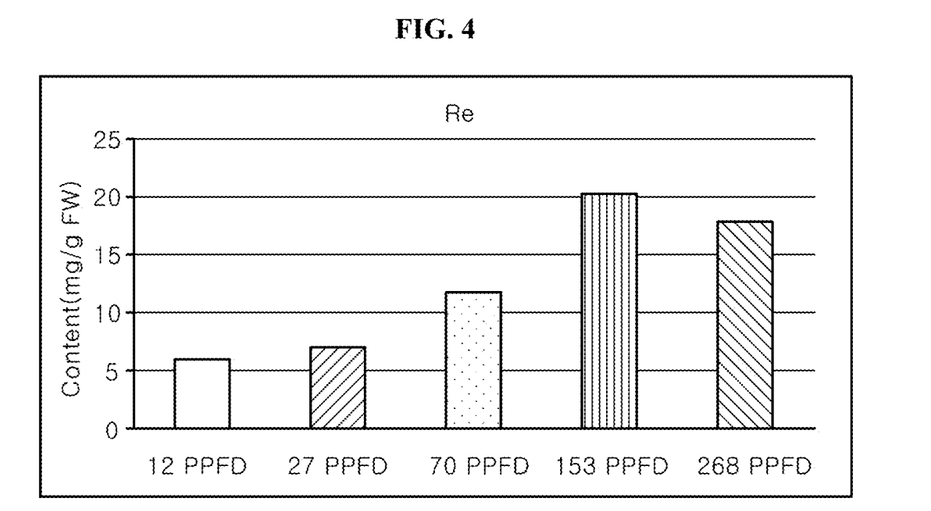
FIG. 4 is a graph illustrating the content of Re with respect to the light intensity.
Figure 5:
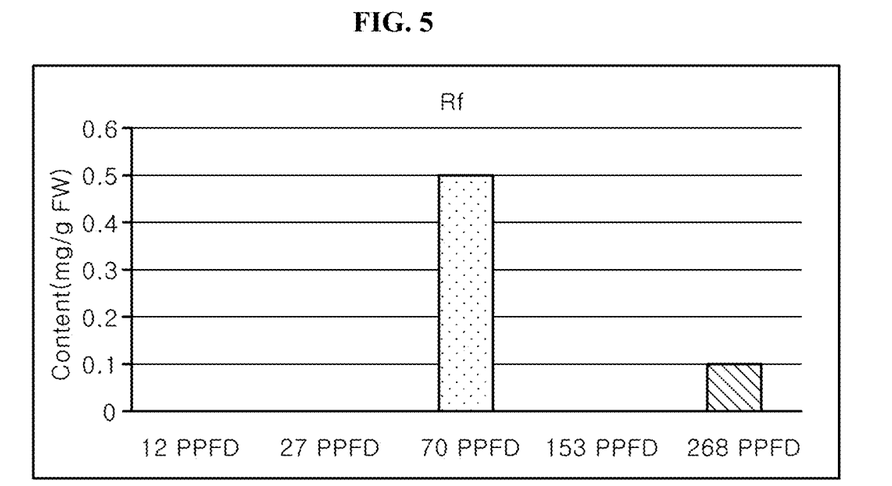
FIG. 5 is a graph illustrating the content of Rf with respect to the light intensity.
Figure 6:
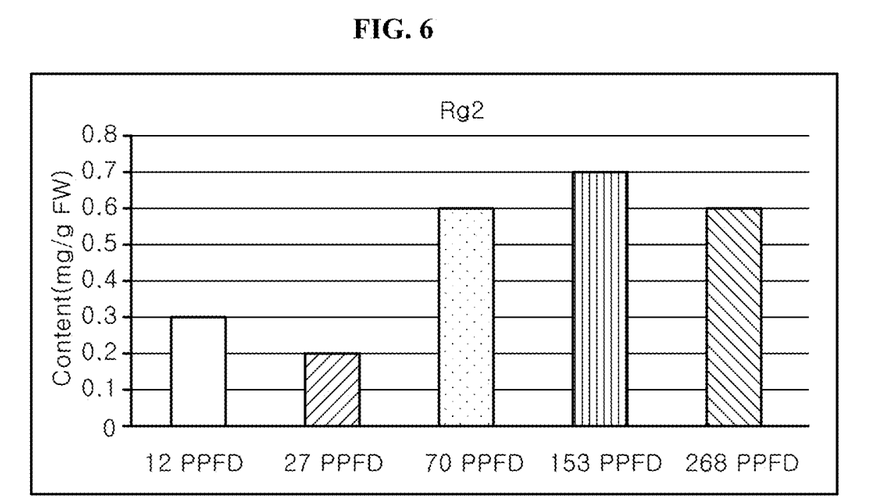
FIG. 6 is a graph illustrating the content of Rg2 with respect to the light intensity.
Figure 7:
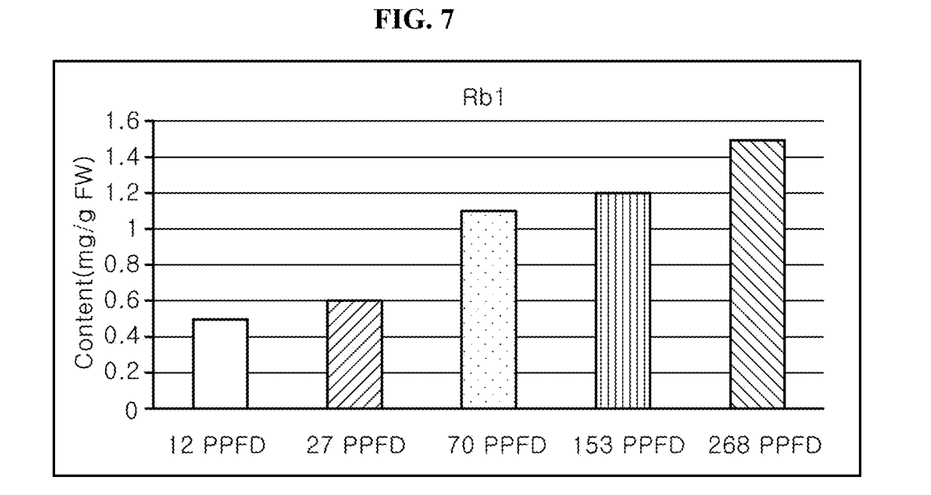
FIG. 7 is a graph illustrating the content of Rb1 with respect to the light intensity.
Figure 8:
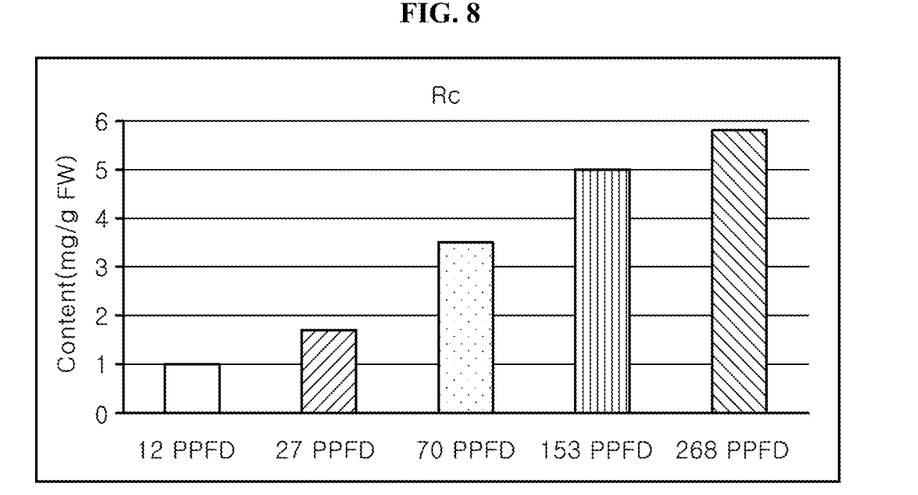
FIG. 8 is a graph illustrating the content of Rc with respect to the light intensity.
Figure 9:
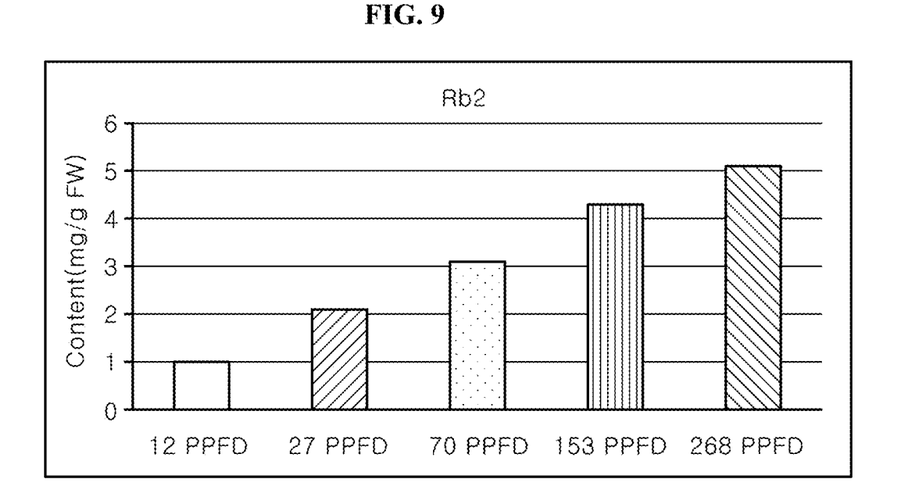
FIG. 9 is a graph illustrating the content of Rb2 with respect to the light intensity.
Figure 10:
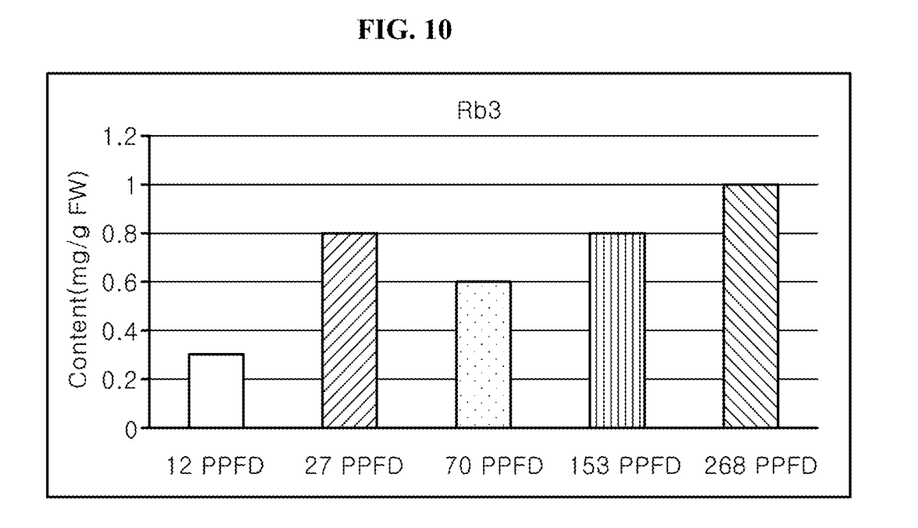
FIG. 10 is a graph illustrating the content of Rb3 with respect to the light intensity.
Figure 11:
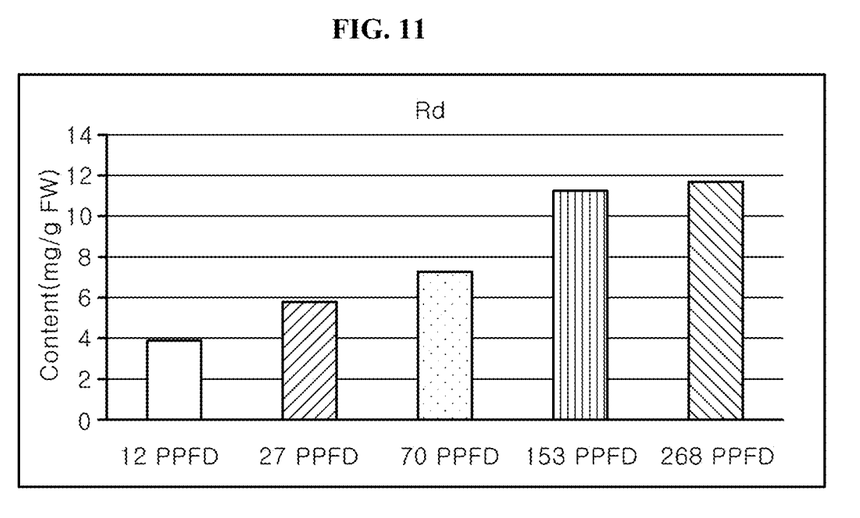
FIG. 11 is a graph illustrating the content of Rd with respect to the light intensity.
Figure 12:
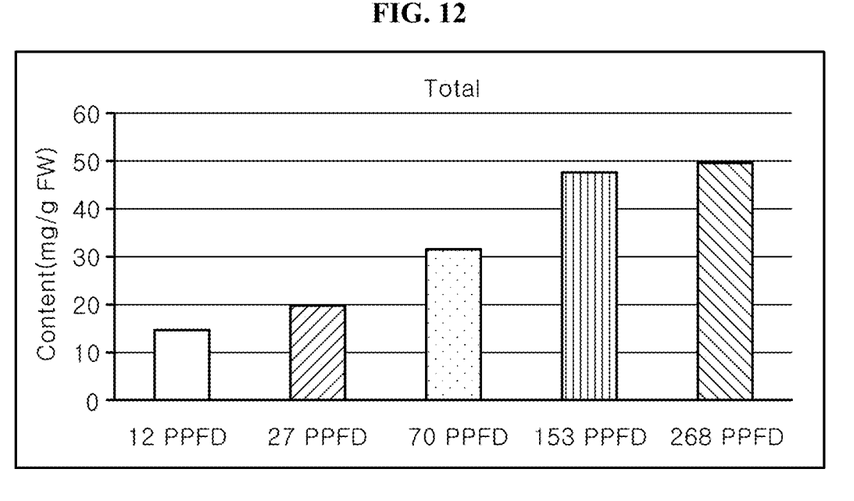
FIG. 12 is a graph illustrating the total content of ginsenoside components Rf.

FIG. 3 and FIG. 11 are graphs showing the contents of the respective ginsenoside components. FIG. 3 is a graph illustrating the content of Rg1 with respect to the light intensity. FIG. 4 is a graph illustrating the content of Re with respect to the light intensity; FIG. 5 is a graph illustrating the content of Rf with respect to the light intensity. FIG. 6 is a graph illustrating the content of Rg2 with respect to the light intensity. FIG. 7 is a graph illustrating the content of Rb 1 with respect to the light intensity. FIG. 8 is a graph illustrating the content of Rc with respect to the light intensity. FIG. 9 is a graph illustrating the content of Rb2 with respect to the light intensity. FIG. 10 is a graph illustrating the content of Rb3 with respect to the light intensity. FIG. 11 is a graph illustrating the content of Rd with respect to the light intensity. FIG. 12 is a graph showing the total content of the ginsenoside components. In addition, Table 1 shows change in content of the ginsenoside components with increasing light intensity from a light intensity of 12 PPFD.

TABLE 1

| | Rate Of Change In Content Of Ginsenoside Components | | | | | | | | | |
|---|---|---|---|---|---|---|---|---|---|---|
| Light intensity | Rg1 | Re | Rf | Rg2 | Rb1 | Rc | Rb2 | Rb3 | Rd | Total |
| 12 PPFD | 0% | 0% | 0% | 0% | 0% | 0% | 0% | 0% | 0% | 0% |
| 27 PPFD | 2% | 16% | 0% | −37% | 18% | 64% | 105% | 180% | 48% | 35% |
| 70 PPFD | 99% | 94% | 0% | 95% | 140% | 231% | 210% | 121% | 86% | 116% |
| 153 PPFD | 170% | 235% | 0% | 134% | 162% | 379% | 324% | 188% | 188% | 227% |
| 268 PPFD | 278% | 196% | 0% | 101% | 226% | 453% | 404% | 252% | 197% | 239% |

Referring to FIG. 3, it can be seen that the content of Rg1 increased with increasing light intensity.

Referring to FIG. 4, the content of Re had a higher value at light intensities of 27 PPFD, 70 PPFD, 153 PPFD, and 268 PPFD than at a light intensity of 12 PPFD.

Referring to FIG. 5, average values of the content of Rf measured at light intensities of 70 PPFD and 153 PPFD were 0.5 mg/g and 0.1 mg/g, respectively. However, the content of Rf was determined as zero at the other light intensity levels. That is, light intensity is not considered to have a significant effect on the change in content of Rf. Accordingly, in Table 1, the rates (%) of change in content of Rf depending on light intensity are all shown as 0%.

Referring to FIG. 6, the content of Rg2 had a lower value at a light intensity of 27 PPFD than at a light intensity of 12 PPFD. However, the content of Rg2 had a higher value at light intensities of 70 PPFD, 153 PPFD, and 268 PPFD than at a light intensity of 12 PPFD.

Referring to FIG. 7 to FIG. 9, the contents of Rb1, Rc and Rb2 increased with increasing light intensity.

Referring to FIG. 10, the content of Rb3 had a higher value at light intensities of 27 PPFD, 70 PPFD, 153 PPFD, and 268 PPFD than at a light intensity of 12 PPFD.

Referring to FIG. 11, the content of Rd increased with increasing light intensity.

Referring to FIG. 12, the total content of the ginsenoside components increased with increasing light intensity.

Referring to Table 1, the total content of the ginsenoside components increased by about 35% at a light intensity of 27 PPFD, as compared with at a light intensity of 12 PPFD, and significantly increased by 116%, 227%, and 239% at light intensities of 70 PPFD, 153 PPFD, and 268 PPFD, respectively, as compared with at a light intensity of 12 PPFD.

In addition, referring to Table 1, although the content of most ginsenoside components increased at a light intensity of 27 PPFD, as compared with at a light intensity of 12 PPFD, such increase was insignificant. Furthermore, the content of Rg2 decreased at light intensity of 27 PPFD, as compared with at a light intensity of 12 PPFD.

Therefore, in most cases, it can be seen that intensity of light used to illuminate sprout ginseng needs to exceed 27 PPFD to allow significant increase in ginsenoside content.

Figure 13:
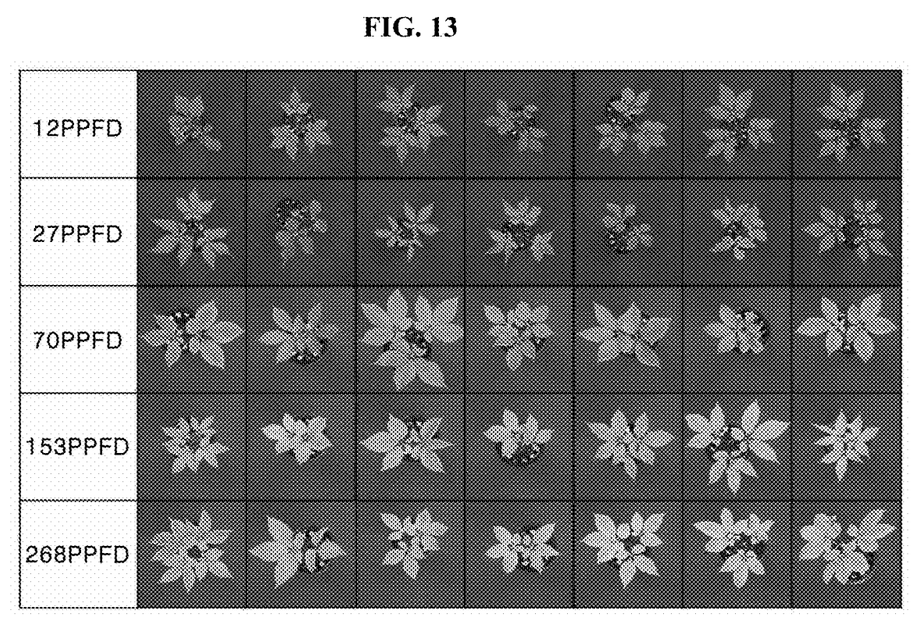
FIG. 13 shows results of an experiment to determine the growth of sprout ginseng depending on light intensity.

FIG. 13 shows results of an experiment to determine the growth of sprout ginseng depending on light intensity.

Plural groups of ginseng seedlings were grown into plural groups of sprout ginseng samples under illumination with different intensity levels. Here, each group of sprout ginseng samples includes plural sprout ginseng samples. This experiment was conducted at light intensities of 12 PPFD, 27 PPFD, 70 PPFD, 153 PPFD, and 268 PPFD.

Referring to FIG. 13, sprout ginseng samples cultivated under illumination with light intensities of 12 PPFD and 27 PPFD exhibited poor growth, which failed to grow to a normal size.

In addition, most sprout ginseng samples cultivated under illumination with a light intensity of 268 PPFD suffered leaf chlorosis. In particular, some sprout ginseng samples suffered severe leaf chlorosis.

Figure 14:
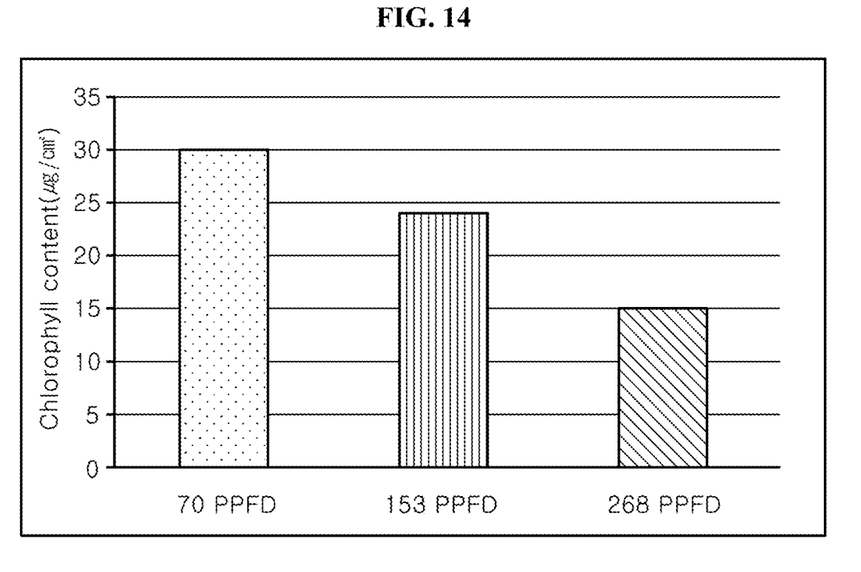
FIG. 14 shows results of an experiment to determine the content of chlorophyll in sprout ginseng depending on light intensity.

FIG. 14 shows results of an experiment to determine the content of chlorophyll in sprout ginseng depending on light intensity.

A sprout ginseng sample was cultivated under illumination with light intensities of 70 PPFD, 153 PPFD, and 268 PPFD for a certain period of time, followed by measurement of the content ($\mu g/cm^2$) of chlorophyll in the sprout ginseng sample. Referring to FIG. 14, it can be seen that the content of chlorophyll decreased with increasing light intensity. When a plant lacks chlorophyll, the plant suffers leaf chlorosis and eventually becomes necrotic.

That is, illumination with a light intensity of 268 PPFD can reduce the chlorophyll content of sprout ginseng, causing leaf chlorosis, as shown in FIG. 13.

In addition, illumination with excessive intensity can cause a plant to suffer leaf burn due to high heat.

Sprout ginseng is a vegetable, leaves, stems, and roots of which can be eaten raw. Therefore, sprout ginseng exhibiting poor growth, such as sprout ginseng samples grown under illumination with light intensities of 12 PPFD and 27 PPFD, and sprout ginseng suffering photodamage, such as sprout ginseng samples grown under illumination with a light intensity of 268 PPFD, have to be discarded.

Conversely, it can be seen that most sprout ginseng samples grown under illumination with a light intensity of 70 PPFD suffered little photodamage. In addition, some sprout ginseng samples grown under illumination with a light intensity of 153 PPFD suffered slight photo-damage.

From the experimental results, it can be seen that illumination with light intensities of 12 PPFD and 27 PPFD is insufficient for sprout ginseng to grow normally. That is, under illumination with light intensities of 12 PPFD and 27 PPFD, sprout ginseng cannot perform sufficient photosynthesis.

In addition, it can be seen that illumination with a light intensity of 268 PPFD is excessive enough to cause photodamage to sprout ginseng.

In other words, the experiment shows that sprout ginseng can grow normally under illumination with a light intensity of greater than 27 PPFD and less than 268 PPFD.

The plant cultivation light source 10 according to this embodiment illuminates sprout ginseng with a light intensity of greater than 27 PPFD and less than 268 PPFD, thereby allowing the sprout ginseng to grow normally while increasing the content of ginsenoside in the sprout ginseng. Thus, the plant cultivation light source 10 according to this embodiment can minimize the waste rate of sprout ginseng, thereby improving the yield rate of sprout ginseng.

Sprout ginseng cultivated using the plant cultivation light source 10 according to this embodiment has increased phytochemical content, whereby an extractable or ingestible amount of the phytochemical per g of the plant can be increased.

Figure 15:
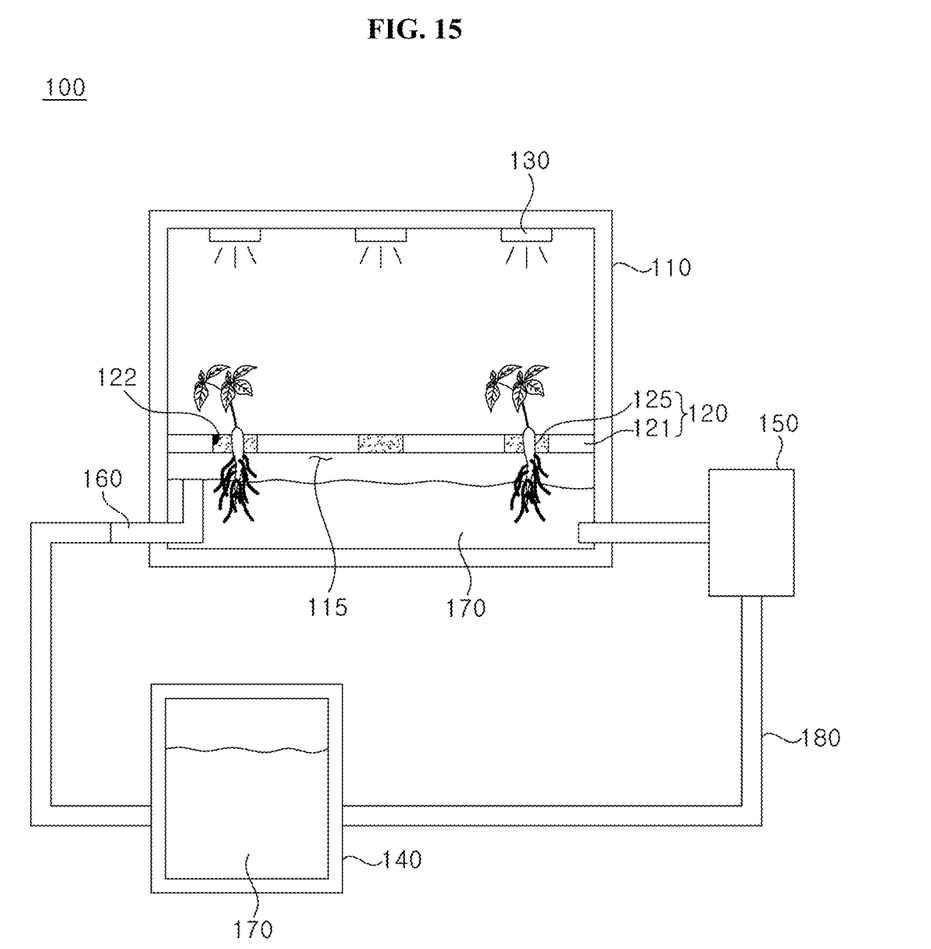
FIG. 15 is a schematic diagram of a plant cultivation apparatus according to one embodiment of the present disclosure.

FIG. 15 is a schematic diagram of a plant cultivation apparatus according to one embodiment of the present disclosure.

A plant cultivation apparatus 100 according to this embodiment may include a housing 110, a cultivation member 120, a light source member 130, a nutrient medium tank 140, a pump 150, and a level control member 160.

The housing 110 has a nutrient medium space 115 for supplying a nutrient medium 170 to a ginseng seedling and is provided therein with the cultivation member 120 and the light source member 130.

An emerged ginseng seedling is replanted in the cultivation member 120.

The cultivation member 120 is disposed above the nutrient medium space 115 to be spaced apart from the surface of the nutrient medium 170. The cultivation member 120 includes a cultivation plate 121 and a securing member 125.

The cultivation plate 121 is secured to the housing 110 to position the ginseng seedling. The cultivation plate 121 has at least one through-hole 122 in which the ginseng seedling is situated.

The securing member 125 is mounted in the through-hole 122 of the cultivation plate 121 such that the ginseng seedling is held in place inside the through-hole 122. For example, the securing member 125 may be rock wool or a sponge.

The securing member 125 allows the ginseng seedling to be maintained in an erect position inside the through-hole 122 of the cultivation plate 121.

The ginseng seedling replanted in the cultivation member 120 is cultivated at a temperature of 20° C. to 25° C. and 60% to 80% RH. In addition, the plant cultivation apparatus 100 illuminates the ginseng seedling and supplies the ginseng seedling with the nutrient medium 170.

The light source member 130 is disposed above the cultivation plate 121 to emit light toward the cultivation plate 121. The light source member 130 according to this embodiment is the same as the plant cultivation light source 10 of FIG. 1. Therefore, the above description of the plant cultivation light source can be referred to for details of the light source member.

Referring to FIG. 15, the nutrient medium tank 140 stores the nutrient medium 170 to be supplied to the ginseng seedling. The pump 150 delivers the nutrient medium 170 from the nutrient medium tank 140 to the nutrient medium space 115 of the housing 110. The housing 110, the nutrient medium tank 140, and the pump 150 may be connected to one another via a pipe 180.

In FIG. 15, the nutrient medium tank 140 and the pump 150 are shown as disposed outside the housing 110. However, it should be understood that the present disclosure is not limited thereto and the nutrient medium tank 140 and the pump 150 may be disposed inside the housing 110. That is, one skilled in the art would perceive that the position and structure of the nutrient medium tank 140 and the pump 150 can be easily changed.

The nutrient medium 170 may be a mixture of nutrient medium A and nutrient medium B as shown in Table 2. In addition, the nutrient medium 170 may have an acidity of 5.5 to 6.5 and an electrical conductivity of 0.8 to 1.2.

TABLE 2

Nutrient Medium Composition

| Nutrient medium | Component | g/L |
|---|---|---|
| Nutrient medium A | Calcium nitrate (Ca(No$_3$)$_2$•4H$_2$O) | 0.4723 |
| | Potassium nitrate (KNO$_3$) | 0.15165 |
| | Iron (Fe-EDTA 98%) | 0.021055 |
| Nutrient medium B | Potassium nitrate (KNO$_3$) | 0.15165 |
| | Ammonium phosphate monobasic (NH$_4$H$_2$PO$_4$) | 0.05753 |
| | Magnesium sulfate (MgSO$_4$•7H$_2$O) | 0.24648 |
| | Boric acid (H$_3$BO$_3$) | 0.000715 |
| | Manganese chloride (MnCl$_2$•4H$_2$O) | 0.000453 |
| | Zinc sulfate (ZnSO$_4$•7H$_2$O) | 0.000055 |
| | Copper sulfate (CuSO$_4$•5H$_2$O) | 0.00002 |
| | Sodium molybdate (Na$_2$MoO$_4$•2H$_2$O) | 0.000005 |

If roots of the ginseng seedling are completely immersed in the nutrient medium 170, the roots can rot due to lack of oxygen. Further, as the water absorption ability of the ginseng seedling is reduced due to damage to the roots, the ginseng seedling has difficulty in receiving sufficient water and thus can suffer leaf scorch and sun scald due to dehydration.

Therefore, the level of the nutrient medium 170 in the nutrient medium space 115 needs to be set to allow only a part of the roots of the ginseng seedling to be immersed in the nutrient medium.

Figure 16:
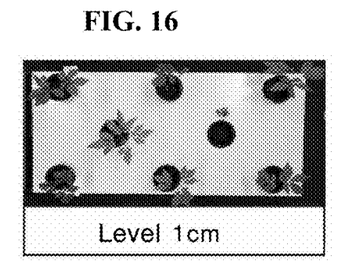
FIG. 16 is an image showing the survival rate of sprout ginseng samples cultivated in the nutrient medium at a level of 1 cm.
Figure 17:
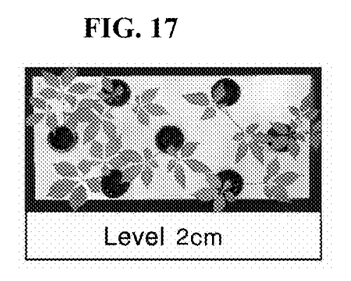
FIG. 17 is an image showing the survival rate of sprout ginseng samples cultivated in the nutrient medium at a level of 2 cm.
Figure 18:
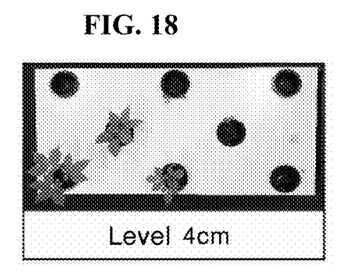
FIG. 18 is an image showing the survival rate of sprout ginseng samples cultivated in the nutrient medium at a level of 4 cm.

FIG. 16 to FIG. 18 show results of an experiment to determine the survival rate of sprout ginseng depending on the level of the nutrient medium. In this experiment, plural sprout ginseng samples were cultivated in the nutrient medium 170 at a level of 1 cm, 2 cm and 4 cm. Here, the light source member 130 emitted light having a light intensity of 153 PPFD.

FIG. 16 is an image showing the survival rate of sprout ginseng samples cultivated in the nutrient medium at a level of 1 cm. FIG. 17 is an image showing the survival rate of sprout ginseng samples cultivated in the nutrient medium at a level of 2 cm. FIG. 18 is an image showing the survival rate of sprout ginseng samples cultivated in the nutrient medium at a level of 4 cm.

Referring to FIG. 16, it can be seen that sprout ginseng samples cultivated in the nutrient medium at a level of 1 cm exhibited poor growth despite having a high survival rate. If the level of the nutrient medium is excessively low, the roots of sprout ginseng cannot be sufficiently immersed in the nutrient medium. That is, since the contact area between the roots of the sprout ginseng and the nutrient medium is reduced, the sprout ginseng cannot receive sufficient nutrients from the nutrient medium. Accordingly, the sprout ginseng exhibits poor growth, as shown in FIG. 16.

Referring to FIG. 18, it can be seen that sprout ginseng samples cultivated in the nutrient medium at a level of 4 cm exhibited a low survival rate. If the level of the nutrient medium is excessively high, the roots of sprout ginseng are almost completely immersed in the nutrient medium, and thus the sprout ginseng cannot be supplied with sufficient oxygen through the roots. As a result, the sprout ginseng rots or is damaged at the roots, and thus has a low survival rate, as shown in FIG. 18.

Referring to FIG. 17, it can be seen that sprout ginseng samples cultivated in the nutrient medium at a level of 2 cm had a high survival rate and grew normally. That is, an appropriate level of the nutrient medium in the nutrient medium space can ensure that sprout ginseng can be supplied with sufficient oxygen and nutrients.

Considering the length of a ginseng seedling or the length of the roots of the ginseng seedling, the level of the nutrient medium needs to be greater than 1 cm and less than 4 cm so as to allow sprout ginseng to have a high survival rate and grow normally.

Referring to FIG. 15, the level of the nutrient medium 170 may be controlled by the level control member 160. The level control member 160 may maintain the level of the nutrient medium 170 within a predetermined range.

For example, the level control member 160 may be a drainage pipe connected between the nutrient medium space 115 of the housing 110 and the outside of the housing 110. Here, the drainage pipe is disposed such that an inlet thereof allowing the nutrient medium 170 to be introduced therethrough is located in the nutrient medium space 115 of the housing 110 and an outlet thereof allowing the introduced nutrient medium 170 to be discharged therethrough is located outside the housing 110.

In addition, the inlet of the drainage pipe may be located to suit a predetermined level of the nutrient medium 170. That is, the inlet of the drainage pipe may be located at a height of 2 cm to 4 cm from a bottom surface of the housing 110.

With this arrangement, when the level of the nutrient medium 170 rises above the inlet of the drainage pipe, the nutrient medium 170 can flow into the inlet of the drainage pipe to be discharged from the housing, thereby maintaining a constant level of the nutrient medium 170 in the nutrient medium space.

Although control of the level of the nutrient medium has been described using the drainage pipe as an example, it should be understood that the level control member 160 is not limited to the drainage pipe. For example, the level control member 160 may include a sensor detecting the level of the nutrient medium 170 and a unit adapted to discharge the nutrient medium 170 in response to a signal from the sensor. As such, the level control member 160 may control the level of the nutrient medium 170 in various ways.

The level control member 160 may discharge the nutrient medium 170 from the housing 110 when the nutrient medium 170 rises above a predetermined level in the nutrient medium space 115.

Alternatively, the level control member 160 may be connected to the nutrient medium tank 140 via the pipe 180, as shown in FIG. 15. With this arrangement, the nutrient medium 170 discharged by the level control member 160 can be returned to the nutrient medium tank 140.

Alternatively, the nutrient medium tank 140 may be connected to the nutrient medium space 115 of the housing 110 via the pipe 180 to recover the nutrient medium 170. With this arrangement, the nutrient medium 170 can continue to be circulated through the nutrient medium tank 140, the pump 150, and the nutrient medium space 115. When the nutrient medium 170 rises above a predetermined level in the nutrient medium space 115, the level control member 160 separately discharges the nutrient medium 170 from the nutrient medium space 115 to the outside of the housing 110 or to the nutrient medium tank 140.

As described above, the plant cultivation light source and the plant cultivation apparatus according to the present disclosure can increase the phytochemical content of a plant without deterioration in quality of the plant. In addition, the plant cultivation light source and the plant cultivation apparatus according to the present disclosure can improve the yield rate of the plant by allowing increase in phytochemical content of the plant without deterioration in quality of the plant.

Although some embodiments have been described herein, it should be understood that these embodiments are provided for illustration only and are not to be construed in any way as limiting the present disclosure. The scope of the present disclosure should be defined by the appended claims and equivalents thereto.

The invention claimed is:

1. A plant cultivation apparatus comprising:
a housing having a nutrient medium space for supplying a nutrient medium to an emerged seedling of a plant, wherein the emerged seedling of the plant comprises:
a seedling satisfying at least one of a first condition that the seedling is aged less than a predetermined time, or a second condition that a weight of the seedling is less than or equal to a predetermined weight;
a cultivation unit disposed above the nutrient medium space and comprising a cultivation plate on which the seedling is cultivated; and
a light source unit disposed above the cultivation plate to illuminate the seedling,
wherein the light source unit r comprises a main light source and an auxiliary light source, the main light source emitting light having at least two peak wavelengths absorbable by chlorophyll, and
wherein the main light source and the auxiliary light source emit light during a light period and do not emit light during a dark period, the light period being set to 16 hours per day and the dark period being set to 8 hours per day, and
wherein the auxiliary light source is configured to emit white light.

2. The plant cultivation apparatus according to claim 1, wherein the main light source emits light having a first peak wavelength and a second peak wavelength, and light intensity of the first peak wavelength is identical to light intensity of the second peak wavelength.

3. The plant cultivation apparatus according to claim 1, wherein the main light source emits red light and blue light.

4. The plant cultivation apparatus according to claim 3, wherein intensity of the red light emitted from the main light source is the same as intensity of the blue light emitted from the main light source.

5. The plant cultivation apparatus according to claim 1, wherein the light source unit emits light having a wavelength of 400 nm to 700 nm.

6. The plant cultivation apparatus according to claim 1, wherein the light emitted from the light source unit has a light intensity of greater than 27 PPFD ($\mu mol/m^2/s$) and less than 268 PPFD.

7. The plant cultivation apparatus of claim 1, wherein the cultivation plate has an opening in which the seedling is situated.

8. The plant cultivation apparatus of claim 7, further comprising a securing unit mounted in the opening to maintain the seedling in the opening.

9. The plant cultivation apparatus of claim 1, further comprising a level control unit connected to the nutrient medium space and configured to maintain a level of the nutrient medium to be within a predetermined range.

10. A plant cultivation light source comprising:
a main light source and an auxiliary light source,
wherein the main light source emits light having at least two peak wavelengths including a first peak wavelength and a second peak wavelength greater than the first peak wavelength, the at least two peak wavelengths falling within a wavelength region absorbable by chlorophyll, and
the main light source is operable to emit light having first color and second color having a predetermined irradiance ratio;
wherein the light emitted from the main light source and the auxiliary light source increases content of a phytochemical in a plant, and the phytochemical is ginsenoside; and
wherein light intensity at the first peak wavelength and light intensity at the second peak wavelength are higher than light intensity at wavelengths that are greater than the first peak wavelength and smaller than the second peak wavelength, and
wherein the light intensity of the first peak wavelength is same as the light intensity of the second peak wavelength.

11. The plant cultivation light source according to claim 10, wherein the main light source emits red light and blue light.

12. The plant cultivation light source according to claim 11, wherein the light intensity of the first peak wavelength corresponds to intensity of the red light emitted from the main light source and the light intensity of the second peak wavelength corresponds to intensity of the blue light emitted from the main light source.

13. The plant cultivation light source according to claim 10, wherein the auxiliary light source emits white light.

14. The plant cultivation light source according to claim 10, wherein the plant cultivation light source emits light having a wavelength of 400 nm to 700 nm and the light intensity at about 450 nm and 650 nm are higher than at wavelengths therebetween.

15. The plant cultivation light source according to claim 10, wherein the light emitted from the plant cultivation light source has a light intensity of greater than 27 PPFD ($\mu mol/m^2/s$) and less than 268 PPFD.

16. A plant cultivation light source comprising:
a main light source and an auxiliary light source,
wherein the main light source emits light having at least two peak wavelengths including a first peak wavelength and a second peak wavelength greater than the first peak wavelength, the at least two peak wavelengths falling within a wavelength region absorbable by chlorophyll, and the main light source is operable to emit light having first color and second color having a predetermined irradiance ratio;

wherein the light emitted from the main light source and the auxiliary light source increases content of a phytochemical in a plant; and wherein light intensity at the first peak wavelength and light intensity at the second peak wavelength are higher than light intensity at wavelengths that are greater than the first peak wavelength and smaller than the second peak wavelength, wherein the main light source and the auxiliary light source emit light during a light period and do not emit light during a dark period, the light period being set to 16 hours per day and the dark period being set to 8 hours per day, and wherein the auxiliary light source emits white light.

17. The plant cultivation light source according to claim 16, wherein the light intensity of the first peak wavelength is same as the light intensity of the second peak wavelength.

18. The plant cultivation light source according to claim 16, wherein the main light source emits red light and blue light.

19. The plant cultivation light source according to claim 16, wherein the plant cultivation light source emits light having a wavelength of 400 nm to 700 nm.

20. The plant cultivation light source according to claim 16, wherein the light emitted from the plant cultivation light source has a light intensity of greater than 27 PPFD (μmol/m$^2$/s) and less than 268 PPFD.

\* \* \* \* \*